Patented Nov. 23, 1926.

1,608,329

UNITED STATES PATENT OFFICE.

ALMER McD. McAFEE, OF PORT ARTHUR, TEXAS, ASSIGNOR TO GULF REFINING COMPANY, OF PITTSBURGH, PENNSYLVANIA, A CORPORATION OF TEXAS.

OILS.

No Drawing.   Application filed March 27, 1922. Serial No. 547,212.

This invention relates to the improvement of oils; and it comprises a method of improving the quality of and adding to the quantity of various petroleum oils, etc., wherein such an oil is warmed, best at about 150° F., with aluminum chlorid and the mixture treated with a hydrogen-rich gas, best oil gas, the operation being advantageously conducted under pressure; all as more fully hereinafter set forth and as claimed.

In various previous patents, notably No. 1,277,329, August 27, 1918, I have described and claimed methods of improving the quality of petroleum oils wherein such an oil is warmed with anhydrous aluminum chlorid under vigorous agitation; the treatment being usually at a temperature around 150° F. In these methods, the oils are not distilled; a body of oil is simply treated to improve it and all the products of the action of the aluminum chlorid are retained in the system. Color and stability are both improved and the oils made of higher quality while the loss of oil is not great. Any unsaturated groups which may be present disappear, the oils thus treated giving little or no reaction with iodin or with sulfuric acid. After a period of action the chlorid loses its activity, or much of it, and remains as a sludge or coky residue; this sludge being much richer in carbon than the original oil. There is a subtraction of carbon from the oil and, thereby, an increase in the ratio of hydrogen to carbon in the oil.

In the present invention I have further improved this method by performing the operation of warming together the oil and the chlorid with a supply of gases rich in hydrogen. The gas may be, or may contain, hydrogen; and advantageously it also contains carbon, being a cheap hydro-carbon gas, such as still gas, natural gas, etc. In so doing, there is a longer period of activity of the aluminum chlorid, the presence of the hydrogen or hydrogen-rich gas retarding formation of heavy tarry bodies rich in carbon and postponing the time when the aluminum chlorid becomes so clogged with carbon or tar that it loses its activity. And there is the greater advantage that the quantity of oil is increased at the expense of the gas; in so far as the gas enters into the reactions caused by the aluminum chlorid there is an increment in the quantity of oil. In the case of hydrogen itself, the increment in the amount of oil is not great and is not so important as the improvement in the quality of the oil and in the prolongation of activity of the chlorid; but in the case of carbon-rich gases the increment in quantity of oil may be quite important.

Inasmuch as the solubility of gases in liquids is in general greater the higher the pressure, it conduces to speed in operation to perform the present process under pressure higher than atmospheric and I therefore frequently do so. Pressure is more advantageous with light gases such as hydrogen and methane than with heavier gases such as unfixed oil gas.

In one way of looking at the action of anhydrous aluminum chlorid upon oils, it involves the establishment of certain equilibria within the oil. The chlorid exercises, so to speak, a sorting and rearranging action by which the hydrogen and the carbon of the hydrocarbons are redistributed into new forms of combination; and this action tends to go forward to some sort of equilibrium between the new bodies produced. The new bodies produced are not necessarily of the same boiling point as those originally present; a fact which I have utilized in certain processes of producing gasoline or gasoline and kerosene from oils of higher boiling point. However, in treating a body of oil with aluminum chlorid the new bodies produced are usually also oils; there is very little formation of gas.

In the present invention as in the acknowledged patents, a body of oil is submitted to the equilibrating action of aluminum chlorid at a comparatively low heat, around 150° F., but there is also another body present and taking part in the equilibria, namely gas (hydrogen, methane, ethane, propane, ethylene, propylene, etc.). This gas, as stated, takes part in the equilibrium actions and to a certain extent contributes to the formation of new oils.

As the gas I may use hydrogen or any hydrogen-containing gas available in the oil refinery. The gas formed in cracking processes for the production of gasoline from other oils (the so-called "cracked gasoline") is particularly suitable for the present purposes. Cracking of the oil may be performed with or without the use of superatmospheric pressure. In using pressure it is immaterial whether the pressure of the still extends through the condenser or not. In cracking under pressure with the still pressure extending to the condenser, there is a better liquefaction of very volatile oils in the condenser and a less loss of these oils from the effluent gas. In cracking oils there is a large formation of gas; much of the oil cracked going to coke and gas and with a large volume of gas, condensation of all the oils in the condenser is difficult whatever the cooling. The gases produced in cracking operations are very suitable for the present purpose for the reason that they are rich in unsaturated hydrocarbons (ethylene, propylene, etc.) and these unsaturated hydrocarbons are more readily reactive with aluminum chlorid than saturated hydrocarbons. However, any other gas produced in and available in the refinery may be used, as may natural gas. The gases coming from the "tar stills" used in petroleum refineries are particularly suitable for the present purposes. The gases formed in coking or carbonizing coal and lignites form a cheap and available material for my purpose. Those formed in low-temperature oil-producing distillations are particularly desirable as containing less free hydrogen and more carbon and being heavier. The heavier the carbon-containing gases, the more soluble they are in oils.

The present process of warming an oil with aluminum chlorid with a supply of gases containing hydrogen or hydrocarbons or both is applicable in the improvement of very many oils occurring in petroleum refineries. It may be utilized with crude petroleum or its distillates or residua. The oil treated should always be dry, that is, free from moisture. The presence of any moisture leads to a waste of aluminum chlorid, only the anhydrous chlorid being suitable for the present purpose. In all cases the oil is made richer in hydrogen. With lubricating oils the effect is to increase the hydrogen content, increase the viscosity and also to increase the total amount of the lubricating oil. With solar oil, gas oil, etc. the effect is to produce lubricating oils. The exact change however, which takes place in the oil depends considerably upon the character of the oil and the particular mode of treatment adopted. In all cases, however, the unsaturated character is done away with, with a consequent improvement in color and stability. For this reason I regard the present process as particularly applicable in the improvement of cracked oils of all kinds.

High temperature distillation always results in cracking, both the distillate and the residue in the still being of "cracked character."

Lubricating oils and other products from tar stills are often badly cracked. Cracked oils are not commercially considered of high quality, being often discolored and being prone to change with age and exposure to light and air. These undesirable qualities are in some way connected with the presence in the oil of "unsaturated hydrocarbons"; hydrocarbons in which not all the available affinities of the carbon are saturated with hydrogen and in which some of the carbon atoms are united with each other by "double bonds" or "triple bonds". Cracked oils are not often "treated" with sulfuric acid in the usual way for the reason that since the acid combines with and removes unsaturated hydrocarbons the loss of oil and the consumption of acid are too great.

The present process is particularly applicable to the improvement of cracked gasoline of which there is much produced at the present time. Where the process is used in treating cracked gasoline, the gases coming from the cracking operation itself may be employed in improving the cracked gasoline obtained as condensate. Ordinarily I practice the present invention at a temperature around 150° F. although I may at times go somewhat higher, say as high as 212° F. As much of the gasoline is volatile at these temperatures in treating gasoline it is best to use a reflux condenser. If the operation is performed in an autoclave, under pressure, as it may be, I cool the upper portion of the container to produce condensation, or connect it to a suitable cooled reflux condenser.

In the simultaneous action of aluminum chlorid on gas and gasoline, there may be, and often is, a production of intermediate products, namely very volatile oils or very heavy gases; and with a refluxing arrangement these cannot escape from the system.

In a specific embodiment of the present invention as applied to gasoline, gas oil may be cracked in any of the usual apparatus and the vapors condensed in the usual way, gases passing beyond the condenser being led to suitable storage means. The cracked gasoline is placed in a container usually provided with suitable stirring mechanism. Agitation, however, may be by the introduced gas only. To the gasoline I add a little aluminum chlorid, say about 5 per cent and warm the mixture to about 150° F. under constant agitation. A reflux condenser which is best water cooled, is provided to take care of volatilized gasoline. Into the agitated body of gasoline and aluminum chlorid I lead a current of the gases from the cracking still or from another source. Gases from cracking operations are quite soluble in gasoline at this temperature. Pressure is here not as desirable as in working with gases of a less solubility; such as hydrogen or methane. Ordinarily, although not necessarily, I lead the gases into a reaction mixture at about the rate at which they are absorbed. It is not desirable to have any great amount of gas passing the reflux cooling means as this leads to inconvenience by carrying off gasoline. Stirring, warming and gas treatment are continued until a withdrawn sample of the gasoline on test with iodin shows the desired reduction in iodin number. Sulfuric acid may be used as the test in lieu of iodin. When the desired reduction in iodin number is obtained, I withdraw the gasoline and allow it to cool to cause the aluminum chlorid to deposit. The deposited aluminum chlorid may be employed in another operation if its activity be not substantially exhausted. Otherwise, it is sent to a recovery plant to regain active aluminum chlorid. The gasoline treated by the present process is light colored and of good quality. It needs no "treatment" with sulfuric acid in the usual sense of purifying it of unsaturated compounds. However, a little sulfuric acid may be agitated with it to withdraw residues of aluminum chlorid. Or the settled gasoline may be simply redistilled.

In cracking oil to produce cracked gasoline the yields are commonly very low, much of the oil, as stated, going to coke and gas. By returning the gas, or some of it, in the manner stated, the yield of marketable gasoline is much increased; and the grade is higher; the treated gasoline being of the grade of "refinery gasoline".

In the treatment of cracked kerosene, burning oils, lubricating oils, etc. the process is the same as that just detailed as regards gasoline. However, with a low temperature operation, say around 150° F. in treating lubricating oil, and particularly where heavy gases are employed, the use of a reflux arrangement may be unnecessary.

Where aluminum or aluminum scrap is obtainable I may use it in lieu of aluminum chlorid (see my prior Patent No. 1,235,523) leading chlorin into the reaction vessel or mixing the chlorin with the gases prior to their entry into the reaction vessel. In either case the desired action is somewhat enhanced. This is particularly useful in treating lubricating oils. Chlorin when added to oil gases reacts therewith to a greater or less extent, forming chlorids of the olefins and, to some extent, substituting in the saturated hydrocarbons with production of alkyl chlorids and HCl. The alkyl chlorids, olefin chlorids and HCl all react with the aluminum and with the oil.

The present invention is particularly advantageous in improving gasoline obtained in cracking under pressure. As stated, in so doing, the still pressure is often allowed to extend through the condenser to promote the condensation of very volatile gasoline which would otherwise escape liquefaction. Even so, however, there is still a considerable loss in this way. But by returning the gas to the gasoline in the present way, these volatiles are utilized and the inconvenience of condensing under pressure is no longer necessary.

While I regard it as best to treat the oil and aluminum chloride with the gas in a rather warm condition, say, at about 150 to 212° F., this is not necessary. The reactions go on at the ordinary temperature, or even at reduced temperatures. The aluminum chlorid unites with some of the oil to form an immiscible liquid and it is in general desirable to stir the liquids to give large-area contact. And stirring is easier with the aluminum chlorid-oil somewhat warm. Obtaining large-area contact is however to some extent a question of design of apparatus; and with proper apparatus it is often convenient to work at low temperatures. The lower the temperature of the system, the greater is the solubility of the gases in the oils and increase in solubility effected at low temperatures often overbalances the quicker reaction and mechanical convenience of working at a somewhat higher temperature.

I do not, however, in the present invention contemplate operation at any very high temperature; say, not above 200° to 300° F. As stated, I do not here desire distillation or the removal of vapors from the system and, with higher temperatures giving free vaporizing, it becomes difficult to retain the products in the system. At higher ranges of temperatures and where distillation results, the action of the aluminum chlorid is in many respects different and is more energetic. A similar type of process operating at these higher temperatures is disclosed and claimed in my copending application Serial No. 529,070.

The active body in the reactions here involved is, of course, the aluminum chlorid and, as stated, aluminum chlorid is not indefinitely soluble in oils; a small quantity in a large quantity of oil melting down with some of the oil to form a heavy liquid immiscible with the rest of it. By operating at 150–212° F., it is somewhat easier to keep this liquid stirred through or emulsified in the rest of the oil and give large area-contact therebetween; and the catalytic actions go forward somewhat more vigorously than at lower temperatures. The actions however also go forward at much lower temperatures sufficiently actively for practical purposes; and, as stated, the solubility of the gas, which is another important factor in the operation, is the greater the lower the temperature. And large area-contact between the liquefied chlorid and the oil, on the one hand, and gas, on the other, can be secured in many other ways than by stirring, as by filming out the liquefied chlorid and the oil in an arrangement like a column still or scrubbing tower. For example, the oil and chlorid may be caused to flow downward through a tower or column against a countercurrent of gas passing upward therethrough. By operating at a sufficiently low temperature, or under pressure, or by using both expedients, many volatile hydrocarbons in the gases may be liquefied and under such temperatures or pressures or both, the solubility of these hydrocarbons in the oil to be treated or improved becomes infinitely great. Another way of obtaining large area-contact is to spray the oil and liquefied aluminum chlorid into an atmosphere of the gas to be used.

What I claim is:—

1. The process of improving petroleum oils which comprises warming a body of such an oil with anhydrous aluminum chlorid under circumstances precluding distillation and supplying gases relatively rich in hydrogen to the reaction mixture.

2. The process of improving cracked gasoline which comprises warming a body of such a gasoline with anhydrous aluminum chlorid under circumstances precluding distillation and supplying gases relatively rich in hydrogen to the reaction mixture.

3. The process of improving petroleum oils which comprises warming a body of such an oil with anhydrous aluminum chlorid under circumstances precluding distillation and supplying gases containing hydrogen and carbon to the reaction mixture, such gases being relatively rich in hydrogen.

4. The process of improving cracked petroleum oils which comprises warming a body of such an oil with anhydrous aluminum chlorid under circumstances precluding distillation and supplying gases containing hydrogen and carbon to the reaction mixture, such gases being relatively rich in hydrogen.

5. The process of improving gasoline which comprises warming a body of such a gasoline with anhydrous aluminum chlorid under circumstances precluding distillation and supplying gases containing hydrogen and carbon to the reaction mixture, such gases being relatively rich in hydrogen.

6. The process of improving cracked gasoline which comprises warming a body of such a gasoline with anhydrous aluminum chlorid under circumstances precluding distillation and supplying gases containing hydrogen and carbon to the reaction mixture, such gases being relatively rich in hydrogen.

7. The process of making high grade gasoline by cracking processes which comprises cracking an oil, condensing gasoline and separating it from the accompanying gases, warming the condensed gasoline with aluminum chlorid and during the warming returning gases from such cracking to the mixture under treatment.

8. The process of improving cracked gasoline which comprises warming a body of such a gasoline with anhydrous aluminum chlorid under circumstances precluding distillation and supplying gases containing hydrogen to the reaction mixture.

In testimony whereof, I have hereunto affixed my signature.

ALMER McD. McAFEE.